(12) United States Patent
Lotito

(10) Patent No.: US 9,519,713 B2
(45) Date of Patent: Dec. 13, 2016

(54) METHOD FOR SEARCHING FOR MULTIMEDIA CONTENT ITEMS ON THE INTERNET

(75) Inventor: Gianpiero Giuseppe Lotito, Pavia (IT)

(73) Assignee: FacilityLive S.r.l., Pavia (IT)

( * ) Notice: Subject to any disclaimer, the term of this patent is extended or adjusted under 35 U.S.C. 154(b) by 351 days.

(21) Appl. No.: 12/582,230

(22) Filed: Oct. 20, 2009

(65) Prior Publication Data

US 2010/0211565 A1  Aug. 19, 2010

(30) Foreign Application Priority Data

Oct. 20, 2008  (IT) .............................. MI2008A1858

(51) Int. Cl.
G06F 17/30   (2006.01)

(52) U.S. Cl.
CPC .............................. *G06F 17/30864* (2013.01)

(58) Field of Classification Search
CPC ..................... G06F 17/30017; G06F 17/30864
See application file for complete search history.

(56) References Cited

U.S. PATENT DOCUMENTS

| | | | | |
|---|---|---|---|---|
| 5,659,742 | A * | 8/1997 | Beattie et al. | |
| 5,675,788 | A * | 10/1997 | Husick et al. | |
| 5,742,816 | A * | 4/1998 | Barr et al. | 707/728 |
| 5,933,597 | A * | 8/1999 | Hogan | 709/204 |
| 6,718,365 | B1 * | 4/2004 | Dutta | G06F 17/30864 707/999.003 |
| 6,772,139 | B1 * | 8/2004 | Smith, III | 707/748 |
| 6,785,670 | B1 * | 8/2004 | Chiang et al. | 707/706 |
| 6,925,475 | B2 * | 8/2005 | Essafi et al. | |
| 6,968,366 | B1 * | 11/2005 | Zhang et al. | 709/219 |
| 7,233,950 | B2 * | 6/2007 | Smith, III | |
| 7,664,830 | B2 * | 2/2010 | Rising, III | 709/218 |
| 7,877,407 | B2 * | 1/2011 | Smith, III | 707/774 |
| 7,996,436 | B2 * | 8/2011 | Schneider et al. | 707/802 |
| 8,019,764 | B1 * | 9/2011 | Nucci | G06F 17/30864 707/739 |
| 8,060,498 | B2 * | 11/2011 | Fiero | 707/723 |
| 8,630,526 | B1 * | 1/2014 | O'Neil et al. | 386/227 |
| 8,751,481 | B2 * | 6/2014 | Camoglu et al. | 707/713 |
| 8,935,745 | B2 * | 1/2015 | Brock | G06F 17/30864 709/223 |

(Continued)

OTHER PUBLICATIONS

Search Report dated Aug. 11, 2009 for corresponding Italian Application No. IT MI20081858.

*Primary Examiner* — James Trujillo
*Assistant Examiner* — Hubert Cheung
(74) *Attorney, Agent, or Firm* — Stephen Bongini; Fleit Gibbons Gutman Bongini & Bianco P.L.

(57) ABSTRACT

A method is provided for searching for multimedia content items on the internet. According to the method, a search page of a search provider is loaded, search text is transmitted from the client to the search provider, an application is executed at the search provider to detect multimedia content items stored in servers and associated with the search text, a results page is transmitted from the search provider to the client. Additionally, each detected multimedia content item is associated with a predetermined type of content items, the results page is divided into multiple areas that are each associated with a corresponding type, and internet addresses of the detected multimedia contents are placed into each of the areas.

30 Claims, 6 Drawing Sheets

(56) References Cited

U.S. PATENT DOCUMENTS

| | | | |
|---|---|---|---|
| 2002/0107718 A1* | 8/2002 | Morrill et al. | 705/10 |
| 2002/0143932 A1* | 10/2002 | Quintero | G06F 17/3089 709/224 |
| 2003/0046703 A1* | 3/2003 | Knowles et al. | 725/92 |
| 2003/0187950 A1* | 10/2003 | Rising, III | 709/218 |
| 2004/0059720 A1* | 3/2004 | Rodriguez | 707/3 |
| 2004/0068527 A1* | 4/2004 | Smith, III | 707/204 |
| 2004/0073536 A1* | 4/2004 | Smith-Semedo | G06F 1/14 |
| 2005/0268248 A1* | 12/2005 | Boerner et al. | 715/788 |
| 2006/0052118 A1* | 3/2006 | Furon | H04N 1/00957 455/466 |
| 2007/0067267 A1* | 3/2007 | Ives | 707/3 |
| 2007/0067305 A1* | 3/2007 | Ives | 707/10 |
| 2007/0130177 A1* | 6/2007 | Schneider et al. | 707/100 |
| 2007/0156761 A1* | 7/2007 | Smith | 707/104.1 |
| 2008/0040426 A1* | 2/2008 | Synstelien et al. | 709/203 |
| 2008/0040681 A1* | 2/2008 | Synstelien et al. | 715/765 |
| 2008/0082512 A1* | 4/2008 | Hogan et al. | 707/3 |
| 2008/0086456 A1* | 4/2008 | Rasanen et al. | 707/3 |
| 2008/0120276 A1* | 5/2008 | Chennavasin | G06F 17/30864 |
| 2008/0162448 A1* | 7/2008 | Jalan | G06F 17/30887 |
| 2008/0168052 A1* | 7/2008 | Ott et al. | 707/5 |
| 2008/0242343 A1 | 10/2008 | Koh et al. | |
| 2008/0320021 A1* | 12/2008 | Chan | G06F 17/30864 |
| 2009/0240674 A1* | 9/2009 | Wilde et al. | 707/4 |
| 2009/0254425 A1* | 10/2009 | Horowitz | G06F 17/30864 705/300 |
| 2010/0049762 A1* | 2/2010 | Cui | G06F 17/30864 707/710 |
| 2010/0070484 A1* | 3/2010 | Kraft | G06F 17/30867 707/706 |
| 2011/0047152 A1* | 2/2011 | Smith, III | 707/723 |

* cited by examiner

METHOD FOR SEARCHING FOR MULTIMEDIA CONTENT ITEMS ON THE INTERNET

CROSS-REFERENCE TO RELATED APPLICATIONS

This application is based upon and claims priority from Italian Patent Application No. MI2008A 001858, filed Oct. 20, 2008, the entire disclosure of which is herein incorporated by reference.

FIELD OF THE INVENTION

The present invention relates to internet searching, and more particularly to methods for searching for multimedia content items on the internet.

BACKGROUND OF THE INVENTION

As is known, multimedia content search methods on the internet provide for connecting a client, for example a personal computer, a PDA, or a mobile telephone, to the internet and loading a search page of a search provider, which is also connected to the internet. In particular, the term "search provider" is used to indicate one or more servers that comprise the search page and an application for providing a multimedia content search service.

Even more in particular, the search page comprises a text box or search field in which the user inserts a keyword or search text in general, which is associated with the multimedia content that the user intends to search, and an "enter" button that transfers the search text from the client to the search provider, which executes an application to search for multimedia content items associated with the search text.

The search provider communicates with a plurality of servers connected to the internet which store multimedia content associated with the search text, records the internet addresses (the "URLs" of such multimedia content), and transmits to the client a results page comprising at least one URL per item of detected multimedia content.

FIG. 1 shows a client 1 comprising a display in which is loaded a search page 2a of a search provider 3 that is connected to the client 1 through the internet, and a plurality of servers 5 which store respective multimedia content R1-RN. The multimedia content is stored on different servers 5, for example, content item R1 in a first server, content item R2 in a second server, content items R3 and R4 in a third server, and content item RN in a fourth server.

The multimedia content items R1-RN are in different electronic formats, for example images, audio, video, text, and the like.

The search page 2a comprises a search field, for example a text box 4, into which a search text "xxx" is inserted and subsequently sent to the search provider 3, which will execute an application 6 to detect, in the servers 5, the multimedia content items R1-RN associated with the search text "xxx". The application 6 inserts the internet addresses (or URLs) of the multimedia content (also indicated, for simplification purposes, with references R1-RN) in a results page 9a, and transmits such results page 9a to the client 1. The client 1 loads the results page 9a in the display, as represented in FIG. 2a. In order to improve the reading and the selection of the multimedia content that is detected, known methods insert only the internet addresses of the multimedia content items in the results page 9a in a predetermined electronic format, for example HTML or text format, and group the addresses associated with the multimedia content items in other formats in different pages 9b, 9c, and 9d, that are accessible through respective buttons 7b, 7c, and 7d or hypertext links found on the results page 9a, each associated with a respective type of multimedia content (as represented in the example of FIG. 2b). The results pages 9b, 9c, and 9d in turn comprise a button for returning to the results page 9a. For example, pages 9b, 9c, and 9d comprise images, videos, and social networks, respectively.

While these known methods provide an overall classification of the type of information found by the search provider according to their format, these methods have the considerable disadvantage that the user is required to click on a hypertext link 7b to display a corresponding results page 9b, and such page 9b replaces, on the display of the client 1, the page 9a that was previously loaded, which substantially prevents simultaneous display of the internet addresses for different types of multimedia content items in the same results page.

Another disadvantage of the known methods is that in order to display a detected multimedia content item during the search that is listed in a results page by its internet address, it is necessary to load a new web page comprising such multimedia content item, which leads to an undesired increase in waiting times and costs for the user. This operation is particularly disadvantageous in cases in which a user would like to view a plurality of multimedia content items, given that several web pages, comprising the respective multimedia content items are loaded into the display device. In particular, the opening of different web pages, each associated with a different type of multimedia content, prevents having a practical and simple display of the search results.

Also known are methods in which the multimedia content, after having been selected through the corresponding internet address, is loaded in place of the results page.

However, these methods are subject to the disadvantage of losing the results page content, which forces the user to return to the search page and perform a new search if not interested in the selected content or wanting to select other multimedia content items.

SUMMARY OF THE INVENTION

One embodiment of the present invention provides a computer-implemented method for searching for multimedia content items on the Internet. According to the method, a search page is sent from a search provider to a client. The search page includes a field for receiving search text associated with the multimedia content items to be searched for. The search text is received from the client at the search provider, and an application is executed at the search provider to detect multimedia content items stored on servers connected thereto. The multimedia content items that are detected are those associated with the search text. Each of the multimedia content items that was detected is automatically associated with a predetermined type of multimedia content items, and a results page is divided into multiple areas. Each of the areas is associated with a corresponding one of predetermined types. At least one Internet address of at least one of the multimedia content items that was detected is placing into each of the areas, and the results page includes at least one Internet address for each of the multimedia content items that was detected. The results page is transmitted from the search provider to the client.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Figure 1:
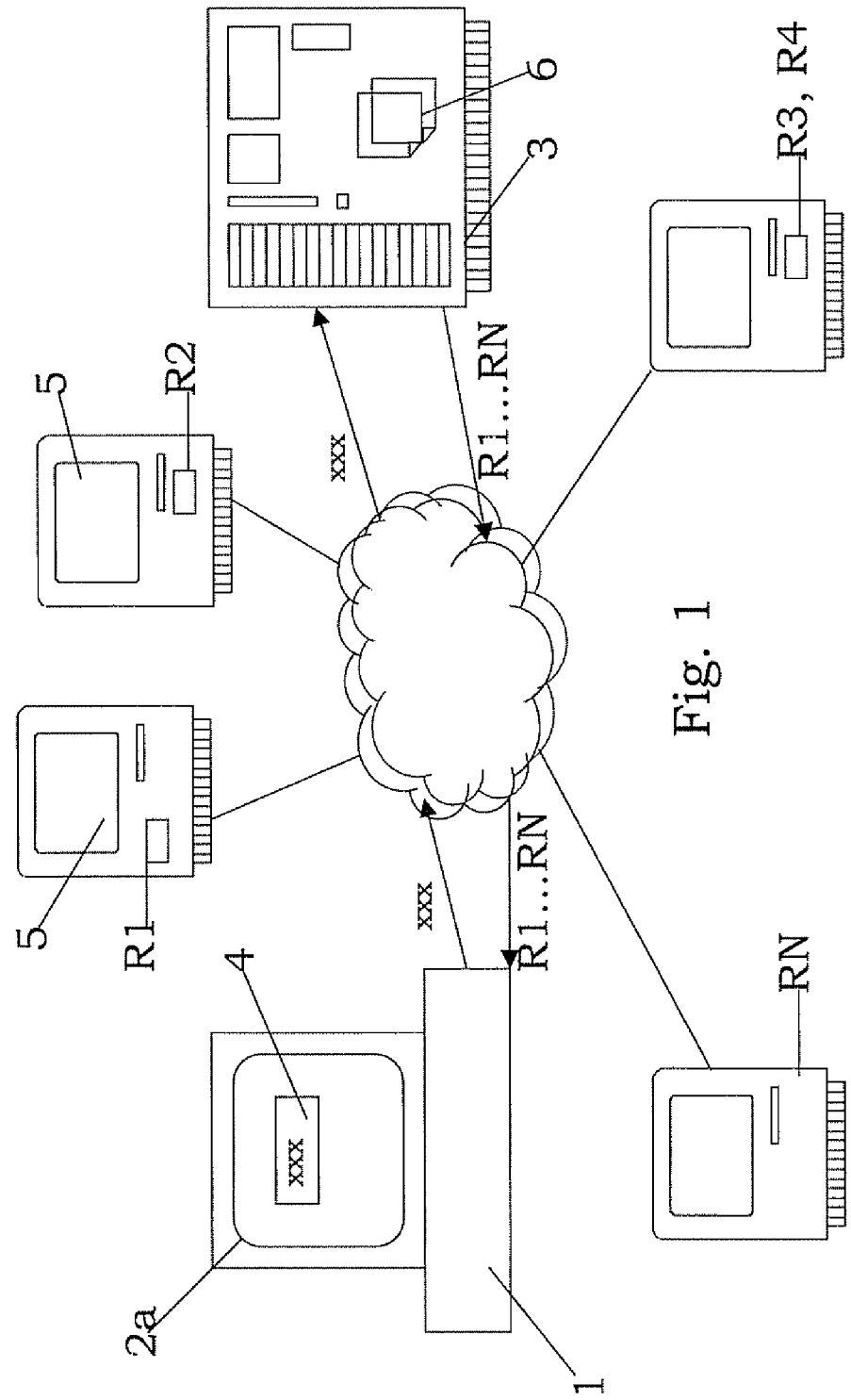
FIG. 1 shows a known method for searching for multimedia content items.
Figure 2A:
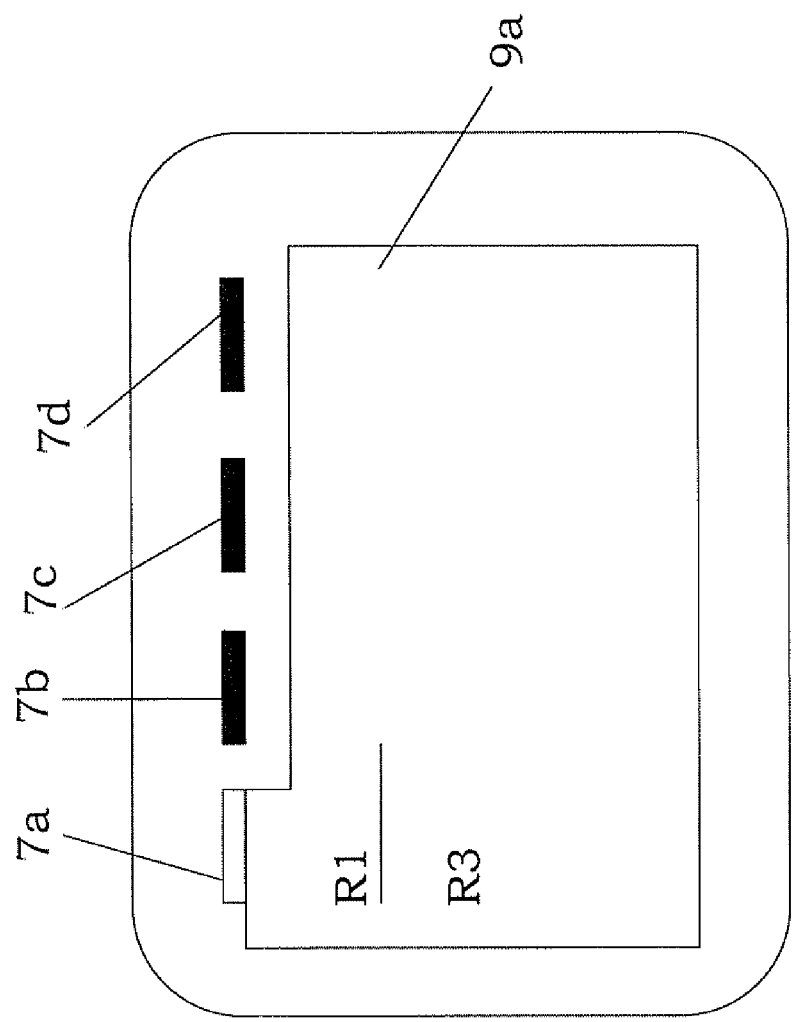
FIGS. 2a and 2b show two different results pages of the search method according to FIG. 1.
Figure 2B:
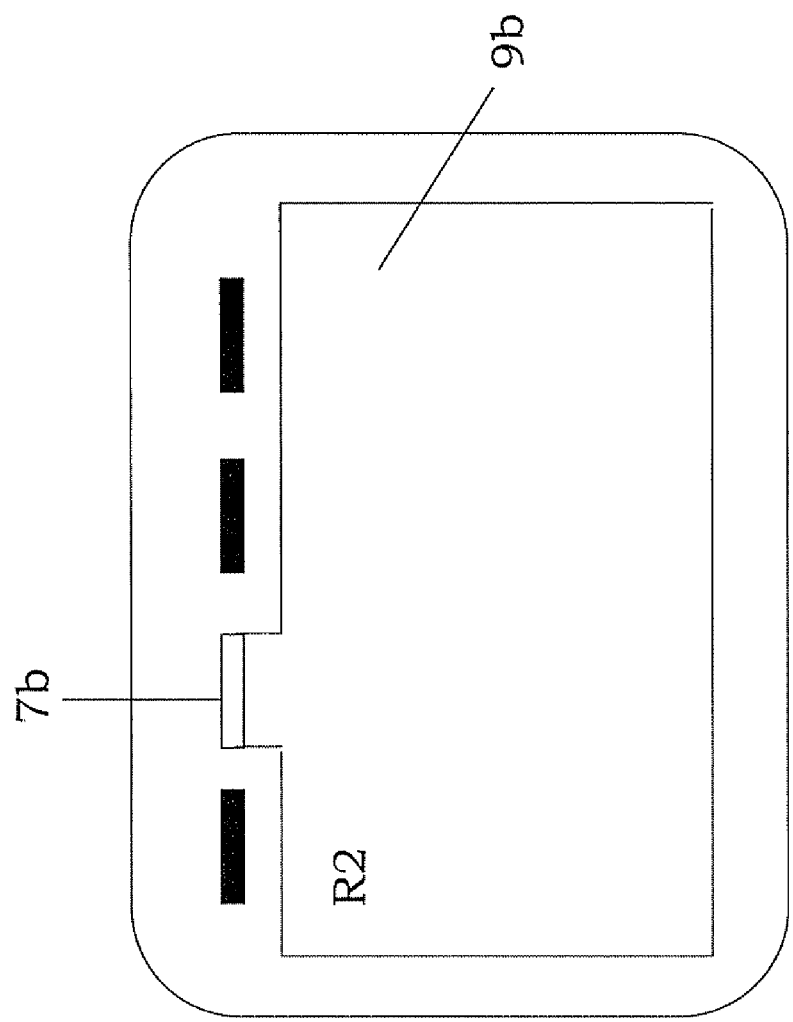

Embodiments of the present invention provide methods for searching multimedia content that are capable of grouping detected multimedia content items according to content type or format, and simultaneously capable of quickly displaying different types of content items with simple selection and loading of the content items, so as to overcome problems affecting the known search methods.

In accordance with the present invention, a single results page of an internet search is divided into a plurality of areas, each of which is associated with a predefined multimedia content type or format, and listed inside of which is a plurality of internet addresses of corresponding multimedia content items.

According to one embodiment of the present invention, a method for searching for multimedia content items on the internet comprises the steps of connecting a client to the internet, loading a search page of a search provider that includes a field in which search text associated with multimedia content to be searched is inserted, transmitting the search text from the client to the search provider, executing an application at the search provider to detect multimedia content items associated with the search text and stored on a plurality of servers connected to the search provider or to the internet, transmitting a results page to the client that includes at least one internet address per detected multimedia content item. Additionally, the method comprises the steps of defining predetermined types of multimedia content items, assigning each detected multimedia content item to a predetermined type, dividing the results page into a plurality of areas that are each associated with a corresponding type, and loading in each of the areas of the results page a predefined number of internet address of the multimedia content items of the corresponding type.

Preferably, the different types of multimedia content items, though being associated with different areas, are grouped into a single results page and displayable simultaneously, so as to not require the loading of a different page for each type of multimedia content.

According to one embodiment, the loading of the internet addresses in the corresponding areas comprises a step of transferring the respective multimedia content items from the servers in which they were detected to a memory of the client. Preferably, the multimedia content in the memory of the client can be displayed in an "off-line" mode, that is even when the client or the server are not connected to the internet. The search method according to the present invention, due to the division of the results page into areas, also allows the adding of numerous improvements regarding selection and display of the multimedia content items associated with the internet addresses, among which are the possibility to select an address, preferably through a "drag&drop" technique, from the corresponding area to a storage folder that stores addresses.

Preferably, the storage folder allows quick saving of the addresses associated with the preferred multimedia content items, as well as grouping of different types of content items.

In one embodiment, the storage folder is displayed as an area of the results page, and saving internet addresses in the storage folder comprises transferring the corresponding multimedia content item from the server to the memory of the client, so as to allow displaying in "off-line" mode.

In some embodiments, it is also provided that the number of areas in the results page is configurable by the user through a toolbar or widgets bar that includes graphic buttons for selecting/deselecting the respective areas. In one embodiment, each area of the results page comprises an application, also referred to as a "widget", for managing the display of the internet addresses.

Preferably, the position and the size of the widgets of which the results page is made up can be configured by the user.

Figure 3:
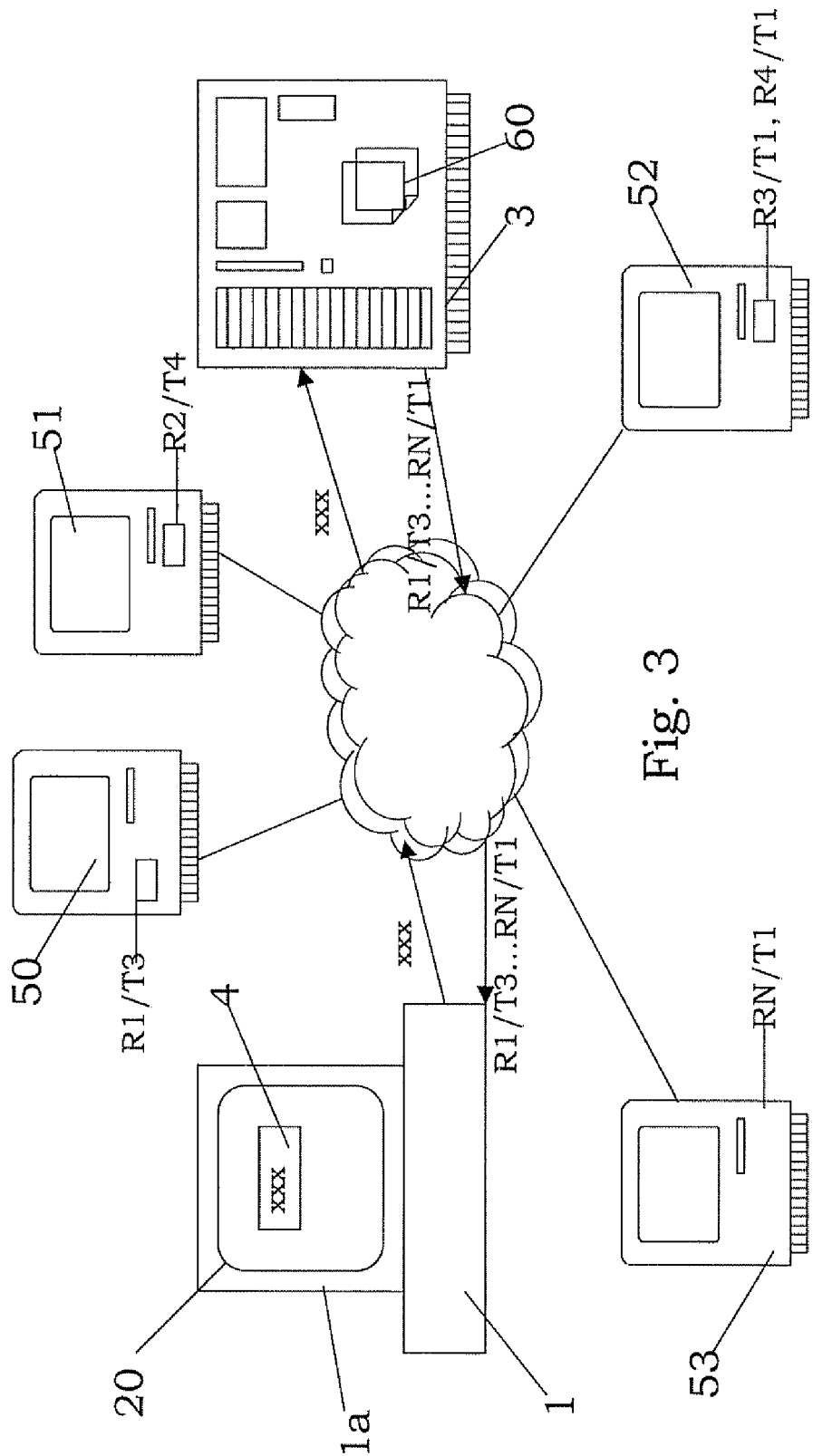
FIG. 3 shows a method for searching for multimedia content items according to one embodiment of the present invention.
Figure 4:
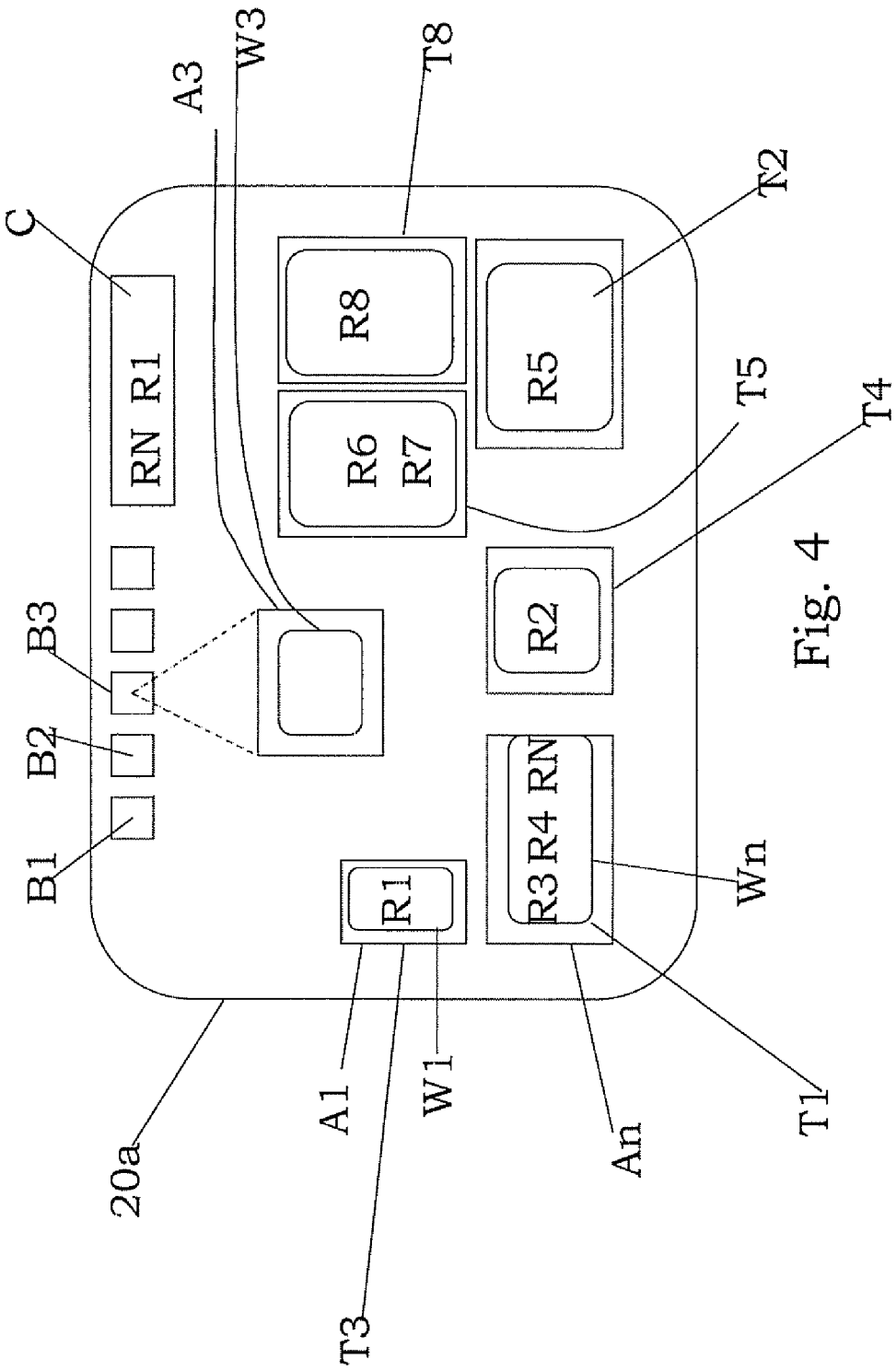
FIG. 4 shows one exemplary search page of the search method according to FIG. 3.
Figure 5:
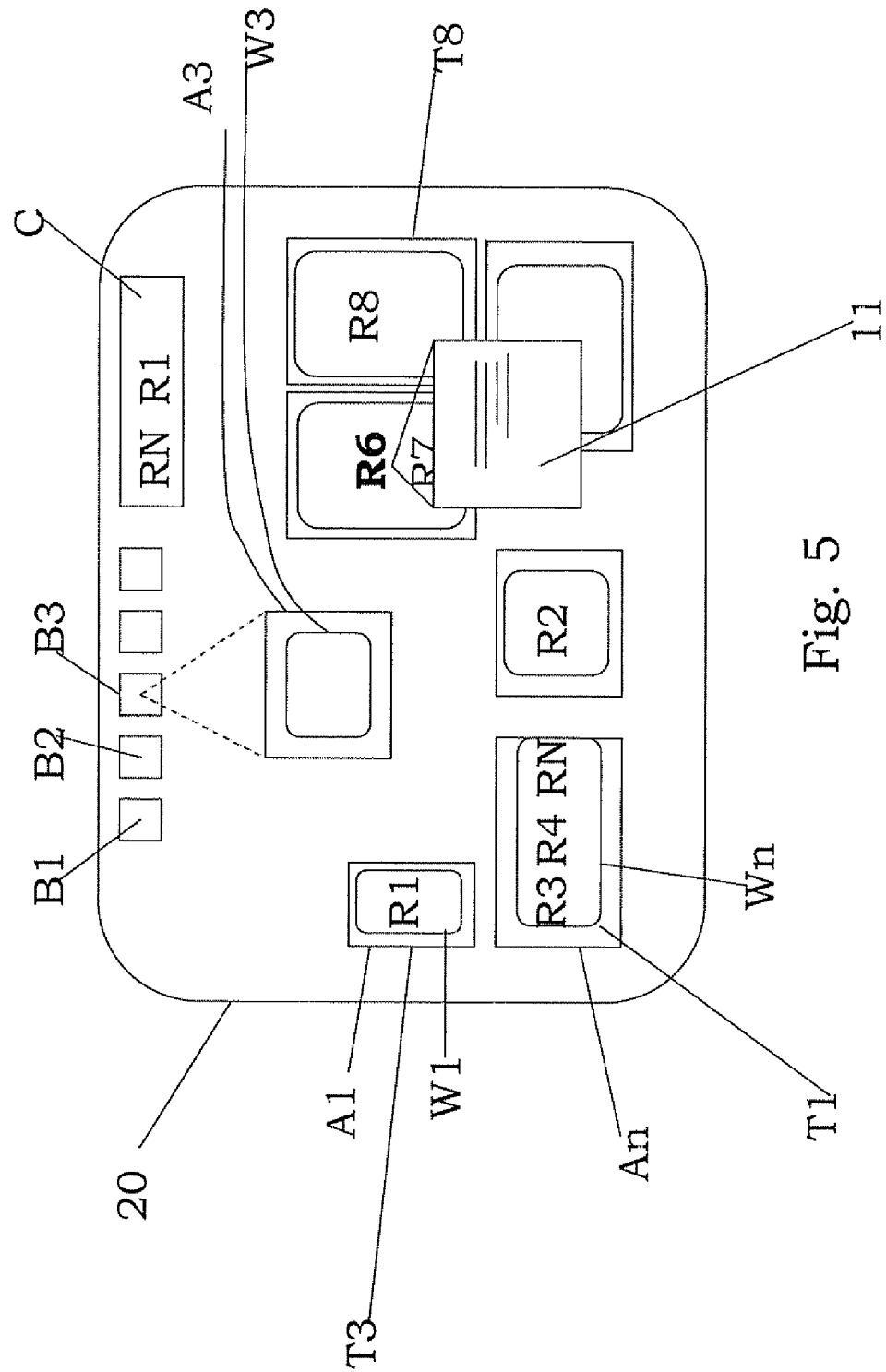
FIG. 5 shows another exemplary search page of the search method according to FIG. 3.

FIGS. 3-5 show a method for searching multimedia content on the internet according to one embodiment of the present invention.

FIG. 3 shows a client 1 comprising a display 1a in which is loaded a search page 20 of a search provider 3 that is connected to the client 1 through the internet and to a plurality of servers 50-54 which store respective multimedia content items R1-RN. Multimedia content is stored on different servers, for example, content item R1 in a first server 50, content item R2 in a second server 51, content items R3 and R4 in a third server 52, and content item RN in a fourth server 53. Multimedia content items R1-RN include different electronic formats, for example images, audio, video, text, and the like, and/or websites, social networks, blogs, search engines, and the like.

The search page 20 comprises a field 4 in which is inserted a keyword or generally search text "xxx" associated with multimedia content to be searched, and a search activation button for transmitting the search text from the client 1 to the search provider 3. The search provider 3 receives the search text "xxx" and executes an application 60 to detect the internet addresses of the multimedia content items stored on the servers 50-54 connected thereto or accessible through the internet.

The search provider 3 sends to the client 1a results page 20a, which is shown in FIG. 4 and comprises at least one internet address for each detected multimedia content item.

The search method of this embodiment comprises defining predetermined types T1-TN of multimedia content (for example the types of "image", "video", "audio", "documents", "blogs", "encyclopedias", "social networks", "hypertext links" and so on), and automatically associating each detected multimedia content item with one of these predetermined types. In particular, this association is performed by detecting the format of a multimedia content item based on the extension of the file corresponding thereto, for example by associating the ".doc", ".txt", ".pdf" extensions with the "text" type, and the ".mpeg" and ".avi" extensions with the "video" type.

In order to detect some types, for example "blogs", "news", "social networks", and the like, the association comprises an analysis of the relative internet addresses, based on specific criteria for each type to be detected.

In particular, for the identification of the "blog" type or the "news" type, the analysis comprises a specific criterion of detecting a keyword in a domain included in the internet address of the multimedia content. For example, analysis of the address "www.hostname.com/dominio/folder/ . . . /news" or of the internet address "www.host3.com/dominio/ . . . /blog" through the specific criterion of detecting a keyword, respectively identifies the "news" keyword and the "blog" keyword, and the relative internet addresses are associated with the "news" and "blog" types. Referring to FIG. 3, the search provider 3 receives search text "xxx" from the client 1 and executes the application 60 to detect multimedia content items in the servers 50-54, detecting, in particular, a multimedia content item R1 in a first server 50, a multimedia content item R2 in a second server 51, two different multimedia content items R3 and R4 in a server 52, and a multimedia content item RN in a server 53.

The application 60 assigns a type to the detected multimedia content items R1-RN and, in this example, assigns type T1 (for example "video") to multimedia content items R3, R4, and RN, type T3 (for example "text") to multimedia content item R1, and type T4 (for example "image") to multimedia content item R2.

As shown in FIG. 4, the internet addresses of the multimedia content items R1-RN are inserted in a results page 20a that is divided into a plurality of areas A1-AN, which are each associated with a corresponding type T1-TN.

In particular, the application 60 loads, in each area A1-AN, a predefined number of links or internet addresses associated with the multimedia content items of the corresponding type T1-TN.

The definition of the predefined types comprises assigning at least one display device or software, also referred to as player, to each type T1-TN. As clearly observable from the following description, the player is used for displaying multimedia content items of the corresponding type T1-TN. For example, a text display such as "Adobe Acrobat Reader®" is allocated to a "PDF" type, an Open Source video display (such as Video LAN) is allocated to the "video" type, and an Open Source image display (for example GIMP or Picasa) is allocated to the "images" type.

FIG. 4 shows the results page 20a in which an area A1 is associated with the type T3 and comprises the internet address of the multimedia content item R1, and an area An is associated with the type T1 and comprises the internet addresses of the multimedia content items R3, R4, and RN. For simplicity, indicated in the areas A1-An of FIG. 4 are reference numbers of the multimedia content items, but it is clear that borne in such areas are only the respective internet addresses.

Preferably, the addresses of the multimedia content items R1 and RN, which belong to two different types (respectively T3 and T1) are displayed in two different areas A1 and An which are integrated in the same results page 20a, in particular a web page, and displayed simultaneously.

In this embodiment, the dividing of the results page into different areas comprises programming a widget W1 and Wn for each of the areas A1 and An, inserted inside which is a list of the internet addresses of the same type.

Regarding this, widgets are commonly used as applications comprising graphic elements that can be incorporated into web pages, with each comprising a specific service such as time, news, and weather, and they are provided by a respective provider of the specific service. In this embodiment, the widgets are associated with the same service (i.e., displaying multimedia content items associated with the search text inserted by the user), and they are provided by the application 60 which sees to their programming, depending on the type of multimedia content associated thereto.

In particular, the player allocated to a type T1-TN is automatically associated also to the corresponding widget W1-Wn programmed for the corresponding area A1-An.

According to this embodiment, loading internet addresses into the corresponding areas A1-An also comprises transferring respective multimedia content items R1-RN from the servers 50-54 in which they were detected to a memory of the client 1. Preferably, the multimedia content R1-RN in the memory of the client 1 can be displayed in "off-line" mode, when the client and/or the server are not connected to the internet, as clearly observable from the following description.

The method according to this embodiment also comprises selecting, from one of the areas A1-An, an internet address of a multimedia content item R1-RN, and storing the selected address, for a subsequent connection to the server 50-54. The selecting and storing of the content items can be repeated to save the internet addresses of different types of multimedia content items.

Preferably, the selecting and storing are performed through a "drag&drop" technique with the internet address, for example in hypertext format, from the one of the areas A1-An to a storage folder C of the results page 20a. In particular, the "drag&drop" technique comprises selecting (for example using a mouse cursor) the multimedia content link, and dragging the selected link into the storage folder C. Preferably, the storage folder C is also a widget. This advantageously allows saving the most important search results in a single storage folder C which preferably groups the internet links into different types of files, for example images, video, text, and audio and/or links to other websites, social networks, blogs, and the like.

In this embodiment, saving internet addresses in the storage folder C comprises a transfer of the corresponding multimedia content item R1-RN from the servers 50-54 to the memory of the client 1 so as to allow displaying in "off-line" mode. Preferably, the multimedia content items in the storage folder C and the multimedia content items of the areas A1-An are saved separately in the memory of the client.

According to this embodiment, also provided is the ability to browse internet addresses in the storage folder C, as well as delete them.

In particular, the browsing is performed by selecting (for example using the mouse cursor) the storage folder, and opening a corresponding memory window, listed in which are the stored internet addresses. Preferably, the internet addresses are grouped in the memory window into storage sub-folders, for example, divided according to the type of file ("document", "image", "video", "audio", and so on) or according to the performed search (for example based on the search text "xxx"). For example, associated with each storage sub-folder may be a name indicating the multimedia content items that are inserted in that sub-folder.

The deletion is performed by selecting (for example using the left button of the mouse) an internet address of the storage folder C or a storage sub-folder, and deleting it (for example using the right button of the mouse). In further embodiments, the deletion is implemented in a different manner, for example by selecting the internet address and dragging it into a trash basket that is on the results page or by clicking on a delete button in the widget.

In a substantially analogous manner, also provided for is the deletion of a storage sub-folder comprising a plurality of internet addresses.

The method of this embodiment also comprises displaying a preview of a content item found on a destination site, which is stored on one of the servers 50-54, by selecting the corresponding internet address from the list of a given widget. In particular, the selection comprises positioning the cursor (for example the mouse cursor) on an icon adjacent to the internet address of a specific widget and sending an actuation command (for example through a click of the mouse). Selecting the internet address provides for opening a smaller window 11 with respect to the results page 20*a* and inside such results page, and displaying at least one portion of the content item R2 associated with the internet address selected in the smaller window 11, as shown in FIG. 5.

Also provided for is the possibility to execute the player associated with the corresponding widget in the smaller window 11, so as to display a single multimedia content item R2 (audio, video, image, etc.). The association of the player with the widget leads to the considerable advantage of being able to display the multimedia content without having to open a separate window in which the player is executed and without having to connect to the destination site (i.e., the server 50-54 in which the multimedia content item is stored). However, in embodiments of the present invention, it is also possible to execute the player in a separate window, for example full screen, and to load into the player the multimedia content stored in the memory of the client.

This embodiment of the present invention provides for executing an analysis of the multimedia content items that are protected by copyrights. In particular, the application 60 identifies the multimedia content items protected by copyrights and blocks the display of at least part of the content or, if the content is not allowed to viewed in its entirety, signals such multimedia content and links back to the destination site where the document is contained.

Preferably, the smaller window 11 is integrated in the results page 20*a* through a preview function and allows a preview display of the multimedia content R2 selected without opening a new web page or loading the multimedia content in place of the results page 20*a*.

For example, listed inside a widget associated with the "news" type can be a plurality of links regarding websites comprising news items. According to the known methods, in order to display a web site associated with an internet address it is necessary to select the address and load the site into a new web page or in place of the results page. In contrast, according to the method of this embodiment of the present invention, by selecting the link associated with the desired website, a new smaller window with respect to the results page and integrated therein displays the news from the selected site, and, simultaneously, the other widgets of the results page are displayed.

In one embodiment of the present invention, multimedia contents of the same or different types, which are displayed simultaneously on the single results page, can also be simultaneously played in separate portions of the single results page (i.e., in corresponding smaller windows integrated therein).

For example, multimedia content items in the form of text files, audio files, and/or video files are simultaneously displayed as Internet addresses or links in corresponding areas of the single result page; two or more Internet addresses or links may be activated through corresponding activation operations which open predetermined players inside smaller windows in each of which is executed one of the multimedia content items.

Accordingly, a video file may be played at the same time as an audio file in separate small windows which are contemporaneously displayed in the single results page.

This contemporaneous playing of multimedia content items can also involve the same type of multimedia content items, for example two or more different video files or two or more text files.

Preferably, the predetermined activation operations are each associated with a corresponding area of the single result page and with the corresponding type of multimedia content items.

For example, in one embodiment an activation operation can be accomplished by positioning a mouse pointer over an Internet address or link. Preferably, the positioning of the mouse pointer over an Internet address or link is associated with text files (for example, "pdf" or "word" files) so as to cause the immediate display of at least a portion of the corresponding file in a small window.

Alternatively, the activation operation can be accomplished by positioning the mouse pointer on the Internet address or link and subsequently clicking such Internet address or link. Preferably, the positioning of the mouse pointer on the Internet address or link and then clicking is associated with video files because the activation of the corresponding video player is slower than the activation of a text editor, and an explicit user request through the mouse click is preferred before playing the video. Furthermore, the activation operation can be accomplished by positioning the mouse pointer over a predetermined icon (for example, a lens or a small preview thumbnail associated with the Internet address or link). Preferably, this activation is associated with image files for which thumbnails are always available. The thumbnail is also a preview of the image which may be displayed in the small window.

In further embodiments, any association of the above or other activation operations with different types of multimedia content is possible.

The dividing of the search page into a plurality of areas provides for the possibility of adding or removing one or more widgets by selecting or deselecting a button in a toolbar or widgets bar, which is present on the results page 20*a*.

Preferably, the widgets selected when searching multimedia content items associated with one search text are also displayed during the subsequent searches associated with different search texts. Preferably, the application 60 excludes from the results page 20*a* the widgets that, though being selected, do not comprise internet addresses, given that the application 60 did not detect multimedia content items of the corresponding type.

As shown in FIG. 4, buttons B1 and B2 of the widgets bar are associated with two widgets W1 and W2, which are already programmed for the respective areas A1 and A2, and a button B3 is associated with a widget W3 and to a respective area which is added in the results page 20*a* when the button B3 is selected.

Preferably, the results page 20*a* can be personalized by a user by selecting a plurality of widgets programmed according to the type of multimedia content associated thereto.

In the embodiment described above, the method automatically associates the multimedia content items with predefined types, for example, according to the extension of the file or to the presence of a tag for detecting the detected multimedia content.

However, there is the possibility that a multimedia content item of a first type T1 is erroneously automatically associated with a second type T2.

In one embodiment of the present invention, the performed search Is validated so as to allow manual modification of the associations that were performed automatically between multimedia content items and types.

In particular, validation is performed manually by an operator and comprises detecting a multimedia content item erroneously associated with a first type and detecting a second type to be associated with the multimedia content item, and selecting the multimedia content item and associating it manually with the second type.

This validation is supported by a results page validation interface 20a, with a protected access, for example through a user name and password.

In particular, the selections and associations that are performed are stored in a database of the search provider 3, which is accessible to the application 60. Preferably, searching of multimedia content items associated with search text "xxx" for which the validation had already been performed, is free of erroneous automatic associations, given that such associations were removed manually, through the validation interface.

Preferably, the selection and association were performed through the "drag&drop" of the multimedia content detected by the widget W1 (corresponding to the type erroneously associated with it) to a second widget W2 (corresponding to the second type).

In one embodiment, the drag&drop is implemented through an "Inter-widget" function which allows communication between the first widget W1 and the second widget W2.

The "Inter-widget" function stores a value "0", "1", or "−1" in each widget, which are respectively associated with a current status ("0"), a reception status ("1"), or a transmission status ("−1") of the widget. The function of "drag&drop" from widget W1 to widget W2 is implemented by modifying the value of widget W1 from "0" to "−1" and the value of widget W2 from "0" to "1".

Preferably, the method not only allows transmitting internet addresses from the search provider 3 to a plurality of widgets W1-WN but also transferring the internet addresses between the widgets themselves, after such addresses have been transmitted, in the results page 20a, to the client 1. The validation also preferably comprises the allocation of a ranking value to each of the detected multimedia content items and elimination of the internet addresses of the multimedia content items that are not relevant to the search text. Preferably, the internet addresses of the multimedia content items in the respective areas were ordered according to a decreasing ranking value according to importance, relevance, and reliability of the source.

According to one embodiment of the present invention, the validation interface of the results page 20a comprises, in each widget and for each internet address to be validated, a field for inserting the ranking value. Preferably, the field is of the "check box" type comprising a plurality M of boxes corresponding to ranking values 1−M.

Preferably, the validation interface inserts a default value in the field, calculated automatically by the application 60 according to known ranking algorithms, and the operator selectively modifies such value manually (increasing, decreasing, or leaving it unaltered). In this manner, the operator substantially contributes both to an orderly arrangement of the multimedia content items associated with the searches, and to the deletion of unwanted internet addresses.

The validation of a search performed on a given search text "xxx" can be repeated several times. In such case, the application 60 displays, in each area and for each internet address, the ranking value automatically allocated by the application 60 or modified manually by an operator, through the validation interface.

According to this embodiment of the present invention, the validation also comprises an allocation of one or more "yyy" tags to the detected internet addresses and the storage of the tags in the database of the search provider 3. In particular, upon allocation of the "yyy" tags, the multimedia content items associated with the respective internet addresses can be detected by inserting the "yyy" tag in the text box 4.

The known search methods are not capable of performing searches according to the actual semantics of the words (i.e., the linguistic meaning they are associated with and commonly interpreted by human beings).

Preferably, the association of the "yyy" tag with the internet addresses allows the detection of the internet address through a search of the semantic type (i.e., using the language commonly used by human beings).

The multimedia content items that are already validated are stored together with the corresponding "yyy" tag inside the database of the search provider 3.

In some embodiments of the present invention, internet addresses of multimedia content items that are not automatically detected by the application 60 can manually be associated with the tag "yyy" or included in the search results based on the predetermined search text "xxx", and stored in the database of the search provider 3.

In one embodiment of the present invention, a search page including multiple multimedia content items that are automatically detected by the application 60, starting from the search text xxx, may be completely modified (i.e. removing the multimedia content items and adding Internet addresses of multimedia content items that are not automatically detected). The added Internet addresses are associated and stored inside the database of the search provider 3, together with corresponding tag "yyy".

The modified search page is a dossier which is created from the user and stored in the database of the search provider 3.

According to another embodiment of the present invention, the validation involves modifying the multimedia content stored in the database of the search provider 3. For example, a portion of a text file or its abstract may be modified.

According to one embodiment of the present invention, the validation is simplified by the preview display of the multimedia content items which allows the operator to assign a ranking value to a given content item, without loading the multimedia content item into a new web page or in place of the results page 20a.

Preferably, the different types of multimedia content items, though being associated with different areas, are grouped in a single results page and displayable simultaneously, without requiring the loading of a different web page for each type of multimedia content.

Preferably, a storage folder allows quick saving of the addresses associated with the preferred multimedia content items, as well as grouping content items of different types.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for searching for multimedia content items on the Internet, the computer-implemented method comprising the steps of:
sending, from a search provider to a client a search page, the search page including a field for receiving search text associated with the multimedia content items to be searched for;
receiving, from the client at the search provider, the search text;
executing an application at the search provider for detecting multimedia content items that are associated with the search text, the multimedia content items being stored on a plurality of servers coupled thereto;
automatically associating each of the multimedia content items that was detected with one of a plurality of predetermined multimedia content types;
associating at least one display program or at least one player with each of the predetermined multimedia content types for displaying the multimedia content items of that predetermined multimedia content type;
dividing a single results page into a plurality of areas, each of the areas being associated with a different one of the predetermined multimedia content types, the dividing step comprising programming a plurality of widgets, each of the areas comprising a different one of the widgets that is incorporated into that one area of the single results page, each of the widgets being an application for managing the display of a list of the Internet addresses of the multimedia content items of its corresponding area, and the at least one display program or the at least one player associated with each of the predetermined multimedia content types being associated with the widget programmed for the area that is associated with that predetermined multimedia content type;
using the widgets to display in each of the areas of the single results page the list of the Internet addresses of the multimedia content items that were detected that are of the predetermined multimedia content type associated with that area of the single results page;
after the dividing and using steps, transmitting the single results page from the search provider to the client; and
manually validating multimedia content items that were detected,
wherein the manually validating step comprises detecting an Internet address of one of the multimedia content items that was associated erroneously with a first of the predetermined multimedia content types, and manually selecting that Internet address and associating the Internet address manually with a second of the predetermined multimedia content types.

2. The computer-implemented method according to claim 1, wherein the transmitting step includes transmitting each of the multimedia content items from one of the servers to a memory of the client.

3. The computer-implemented method according to claim 1, further comprising steps of:
receiving a manual selection of one of the multimedia content items from one of the areas; and
storing the Internet address corresponding to the multimedia content item that was selected in a storage folder of the results page, the storing of the Internet address in the storage folder comprising transferring the corresponding multimedia content item to the memory of the client so as to allow display in off-line mode.

4. The computer-implemented method according to claim 3, wherein the step of receiving the manual selection comprises transmitting the multimedia content item that was selected from one of the servers to the memory of the client.

5. The computer-implemented method according to claim 3, wherein the step of receiving the manual selection comprises receiving a "drag&drop" of the multimedia content item from one of the areas to the storage folder.

6. The computer-implemented method according to claim 3, wherein the storage folder stores multimedia content items associated with a plurality of the predetermined multimedia content types.

7. The computer-implemented method according to claim 1, further comprising:
receiving a selection of one of the Internet addresses from one of the lists of the Internet addresses from the widget;
opening, so as to be embedded within the single results page, a window of reduced size with respect to a size of the single results page; and
executing the display program or the player associated with the widget so as to display or play the multimedia content item of the selected Internet address in the window of reduced size that is integrated into the single results page.

8. The computer-implemented method according to claim 7,
wherein the step of receiving a selection comprises receiving a manual selection of the one of the Internet addresses from one of the lists of the Internet addresses.

9. The computer-implemented method according to claim 1, wherein the dividing step comprises changing the number of areas in the single results page by adding or removing one or more of the widgets by the user selecting or deselecting a button in a widgets toolbar on the single results page.

10. The computer-implemented method according to claim 9, further comprising the step of allowing the user to configure position and size of the widgets of the single results page.

11. The computer-implemented method according to claim 1, wherein the manually selecting that Internet address and associating the Internet address manually with the second predetermined multimedia content type comprises receiving a "drag&drop" of the Internet address from the area that is associated with the first predetermined multimedia content type to the area associated to the second predetermined multimedia content type.

12. The computer-implemented method according to claim 1, wherein the manually validating step comprises assigning a ranking value to each of the multimedia content items that were detected, the multimedia content items of each of the areas being ordered based on their ranking values.

13. The computer-implemented method according to claim 12, wherein the assigning the ranking value comprises an automatic setting of default ranking values using a ranking algorithm, and a manual modification of at least one of the default ranking values.

14. The computer-implemented method according to claim 1, wherein the predetermined multimedia content types comprise an image type, a video type, an audio type, and at least one of text and document types.

15. The computer-implemented method according to claim 1, wherein the predetermined multimedia content types comprise a blog type and a social network type.

16. The computer-implemented method according to claim 1, wherein in the transmitting step, the single results page includes all of the widgets so as to simultaneously display the lists of the Internet addresses of the multimedia content items of all of the multimedia content types in all of the areas.

17. A non-transitory computer-readable storage medium encoded with a computer program for searching for multimedia content items on the Internet, the computer program containing instructions for performing the steps of:
sending, from a search provider to a client a search page, the search page including a field for receiving search text associated with the multimedia content items to be searched for;
receiving, from the client at the search provider, the search text;
executing an application at the search provider for detecting multimedia content items that are associated with the search text, the multimedia content items being stored on a plurality of servers coupled thereto;
automatically associating each of the multimedia content items that was detected with one of a plurality of predetermined multimedia content types;
associating at least one display program or at least one player with each of the predetermined multimedia content types for displaying the multimedia content items of that predetermined multimedia content type;
dividing a single results page into a plurality of areas, each of the areas being associated with a different one of the predetermined multimedia content types, the dividing step comprising programming a plurality of widgets, each of the areas comprising a different one of the widgets that is incorporated into that one area of the single results page, each of the widgets being an application for managing the display of a list of the Internet addresses of the multimedia content items of its corresponding area, and the at least one display program or the at least one player associated with each of the predetermined multimedia content types being associated with the widget programmed for the area that is associated with that predetermined multimedia content type;
using the widgets to display in each of the areas of the single results page the list of the Internet addresses of the multimedia content items that were detected that are of the predetermined multimedia content type associated with that area of the single results page;
after the dividing and using steps, transmitting the single results page from the search provider to the client; and
manually validating multimedia content items that were detected,
wherein the manually validating step comprises detecting an Internet address of one of the multimedia content items that was associated erroneously with a first of the predetermined multimedia content types, and manually selecting that Internet address and associating the Internet address manually with a second of the predetermined multimedia content types.

18. An information processing system for searching for multimedia content items on the Internet, the information processing system comprising:
at least one processor programmed to:
send, from a search provider to a client a search page, the search page including a field for receiving search text associated with the multimedia content items to be searched for;
receive, from the client at the search provider, the search text;
detect multimedia content items that are associated with the search text, the multimedia content items being stored on a plurality of servers coupled thereto;
automatically associate each of the multimedia content items that was detected with one of a plurality of predetermined multimedia content types;
associate at least one display program or at least one player with each of the predetermined multimedia content types for displaying the multimedia content items of that predetermined multimedia content type;
divide a single results page into a plurality of areas, each of the areas being associated with a different one of the predetermined multimedia content types, the dividing of the single results page comprising programming a plurality of widgets, each of the areas comprising a different one of the widgets that is incorporated into that one area of the single results page, each of the widgets being an application for managing the display of a list of the Internet addresses of the multimedia content items of its corresponding area, and the at least one display program or the at least one player associated with each of the predetermined multimedia content types being associated with the widget programmed for the area that is associated with that predetermined multimedia content type;
display in each of the areas of the single results page the list of the Internet addresses of the multimedia content items that were detected that are of the predetermined multimedia content type associated with that area of the single results page;
after the dividing and the displaying, transmit the single results page from the search provider to the client; and
manually validate multimedia content items that were detected, the manual validation comprising detecting an Internet address of one of the multimedia content items that was associated erroneously with a first of the predetermined multimedia content types, and manually selecting that Internet address and associating the Internet address manually with a second of the predetermined multimedia content types.

19. A computer-implemented method for searching for multimedia content items on the Internet, the computer implemented method comprising the steps of:
sending, from a search provider to a client a search page, the search page including a field for receiving search text associated with the multimedia content items to be searched for;
receiving, from the client at the search provider, the search text;
executing an application at the search provider for detecting multimedia content items that are associated with the search text, the multimedia content items being stored on a plurality of servers connected thereto;

automatically associating each of the multimedia content items that was detected with one of a plurality of predetermined multimedia content types;

associating at least one display program or at least one player with each of the predetermined multimedia content types for displaying the multimedia content items of that predetermined type;

dividing a single results page into a plurality of areas, each of the areas being associated with a different one of the predetermined multimedia content types, the dividing step comprising programming a widget for each of the areas, each of the widgets including a list of the Internet addresses of the multimedia content items of the corresponding area, and the at least one display program or the at least one player associated with each of the areas being set to the widget programmed for that area;

placing into each of the areas of the single results page Internet addresses of the multimedia content items that were detected that are of the multimedia content type associated with that area of the single results page;

after the dividing and placing steps, transmitting the single results page from the search provider to the client;

receiving a selection of one of the Internet addresses from one of the lists of the Internet addresses from the widget;

opening, so as to be embedded within the single results page, a window of reduced size with respect to a size of the single results page;

executing the display program or the player associated with the widget so as to display or play the multimedia content item of the selected Internet address in the window of reduced size that is embedded within the single results page; and manually validating multimedia content items that were detected, wherein the manually validating step comprises detecting an Internet address of one of the multimedia content items that was associated erroneously with a first of the predetermined multimedia content types, and manually selecting that Internet address and associating the Internet address manually with a second of the predetermined multimedia content types.

20. The computer-implemented method according to claim 19, wherein the transmitting step includes transmitting each of the multimedia content items from one of the servers to a memory of the client.

21. The computer-implemented method according to claim 19, further comprising the steps of:

receiving a selection of one of the multimedia content items from one of the areas; and storing the Internet address corresponding to the multimedia content item that was selected in a storage folder of the results page, the storing of the Internet address in the storage folder comprising transferring the corresponding multimedia content item to the memory of the client so as to allow display in off-line mode.

22. The computer-implemented method according to claim 21, wherein the step of receiving the selection comprises transmitting the multimedia content item that was selected from one of the servers to the memory of the client.

23. The computer-implemented method according to claim 21, wherein the step of receiving the selection comprises receiving a "drag&drop" of the multimedia content item from one of the areas to the storage folder.

24. The computer-implemented method according to claim 21, wherein the storage folder stores multimedia content items associated with a plurality of the predetermined multimedia content types.

25. The computer-implemented method according to claim 19, further comprising the step of changing the number of areas in the single results page by adding or removing one or more of the widgets by the user selecting or deselecting a button in a widgets toolbar on the single results page.

26. The computer-implemented method according to claim 19, wherein the manually selecting that Internet address and associating the Internet address manually with the second predetermined multimedia content type comprises receiving a "drag&drop" of the Internet address from the area that is associated with the first predetermined multimedia content type to the area associated to the second predetermined multimedia content type.

27. The computer-implemented method according to claim 19, wherein the manually validating step comprises assigning a ranking value to each of the multimedia content items that were detected, the multimedia content items of each of the areas being ordered based on their ranking values.

28. The computer-implemented method according to claim 27, wherein the assigning the ranking value comprises an automatic setting of default ranking values using a ranking algorithm, and a manual modification of at least one of the default ranking values.

29. The computer-implemented method according to claim 19, wherein the multimedia content item of the selected Internet address is a video, and in the step of executing the display program or the player, the player associated with the widget is executed so as to play the video in the window of reduced size that is embedded within the single results page.

30. The computer-implemented method according to claim 19, further comprising:

receiving a selection of a second of the Internet addresses from the list of the Internet addresses from another of the widgets;

opening, so as to also be embedded within the single results page, a second window of reduced size with respect to the size of the single results page, and executing the display program or the player associated with the other widget so as to display or play the multimedia content item of the selected second Internet address in the second window of reduced size that is embedded within the single results page.

* * * * *